US005784267A

United States Patent [19]
Koenig et al.

[11] Patent Number: 5,784,267
[45] Date of Patent: Jul. 21, 1998

[54] QUASI-SINE WAVE AND STEPPED SQUARE WAVE AC TO AC CONVERTER

[75] Inventors: David J. Koenig, Wyoming; Sergey Kunin, Minnetonka, both of Minn.

[73] Assignee: Onan Corporation, Minneapolis, Minn.

[21] Appl. No.: 733,627

[22] Filed: Oct. 17, 1996

[51] Int. Cl.$^6$ ............................ H02M 1/12; H02J 3/00
[52] U.S. Cl. ............................................. 363/43; 363/34
[58] Field of Search .......................... 363/34, 37, 17, 363/132, 43, 67, 68

[56] References Cited

U.S. PATENT DOCUMENTS

| | | | |
|---|---|---|---|
| 4,661,761 | 4/1987 | Katsumata | 322/28 |
| 4,992,920 | 2/1991 | Davis | 363/36 |
| 5,077,652 | 12/1991 | Faley | 363/97 |
| 5,111,374 | 5/1992 | Lai et al. | 363/37 |
| 5,182,702 | 1/1993 | Hiramatsu et al. | 363/132 |
| 5,353,212 | 10/1994 | Loftus, Jr. | 363/17 |
| 5,373,433 | 12/1994 | Thomas | 363/43 |
| 5,387,859 | 2/1995 | Murugan et al. | 363/37 |
| 5,481,451 | 1/1996 | Kuwahara | 363/37 |

FOREIGN PATENT DOCUMENTS

93/26082   12/1993   WIPO.

Primary Examiner—Peter S. Wong
Assistant Examiner—Rajnikant B. Patel
Attorney, Agent, or Firm—Merchant, Gould, Smith, Edell, Welter & Schmidt, P.A.

[57] ABSTRACT

A switched AC to AC converter circuit comprises a rectifying circuit, which generates a rectified output signal from an alternating input voltage signal, and a switching circuit for controllably switching the polarity of the output from the rectifying circuit to generate a quasi-sine wave or a stepped wave output voltage signal. The switching circuit is included in the rectifying circuit to form a switched rectifier. The switched AC to AC converter controls the integral number of half input wave cycles comprising a half cycle of the quasi-sine wave output in order to maintain the frequency and root mean square (rms) voltage of the output signal between predetermined limits. The switched AC to AC converter further controls the shape of the output voltage wave output to provide instantaneous control over the maintenance of the rms output voltage.

38 Claims, 11 Drawing Sheets

5,784,267

1

QUASI-SINE WAVE AND STEPPED SQUARE WAVE AC TO AC CONVERTER

FIELD OF THE INVENTION

This invention relates generally to the field of electrical power generating equipment and, more particularly, to a switched rectifier for generating an AC output.

BACKGROUND OF THE INVENTION

Portable electrical power generators are required in many applications including recreational vehicles, emergency vehicles, military vehicles and small marine vessels. Until recently, known generators operated at a constant engine speed, regardless of load, in order to maintain an electrical output with a constant frequency. This approach has problems with excessive noise, vibration and fuel consumption, especially where the load is small and the power requirement is low. Alternative approaches using multiple pole alternators permit lower engine speeds but do not make full use of engine capacity and are therefore wasteful of weight, size and cost.

In order to reduce the wasted capacity of known generators, Kern et al. (WO 93/26082) disclosed a generator comprising a triac-switched rectifier which controlled the number of half cycles from the alternator output used to comprise a half cycle of the generator output, thus enabling the engine to operate at various speeds. Consequently, the generator maintained an output whose frequency and voltage were maintained within preestablished limits over a wide range of load conditions. However, the Kern generator produces an output waveform which is essentially a squarewave. It is known in the art that a square waveform does not maintain the standard relationship between rms and peak voltage that is maintained by e.g. a sine wave. A squarewave also contains a significant third harmonic component. Electronic power supplies, as used in audio and video equipment, rectify and filter voltage peaks to provide a DC voltage near the AC peak voltage. An electronic power supply, running off an AC generator therefore runs at approximately $1/\sqrt{2}$ times the normal (peak) voltage when run on a sine wave or quasi-sine wave of the present invention. The square-wave generator of Kern is unable to fully compensate for transiently changing load conditions. Kern's generator provides for the transient reduction in rms voltage when the load decreases, but cannot provide for a transient increase in rms voltage when the load increases.

It is further known in the art that the presence of a third harmonic component increases the losses in induction motors and converters, causing heating and a decrease in efficiency. Similarly, battery charger capacity, which is also reliant on wave peaks, is severely reduced with a square wave supply.

There is therefore a need for a voltage and frequency regulated generator which produces an output which maintains the standard peak to rms voltage relationship and which has a low harmonic content.

SUMMARY OF THE INVENTION

A switched AC to AC converter circuit comprises a rectifying circuit, which generates a rectified output signal from an alternating input voltage signal, and a switching circuit for controllably switching the polarity of the output from the rectifying circuit to generate a quasi-sine wave or a stepped wave output signal.

According to a first embodiment, the switched AC to AC converter controls the number of half input wave cycles

2 comprising a half cycle of the quasi-sine wave output in order to maintain the root mean square (rms) voltage of the quasi-sine wave output between predetermined limits. The switched AC to AC converter further controls the shape of the quasi-sine wave output to provide instantaneous control over the rms output voltage.

According a second embodiment, the switched AC to AC converter produces a stepped wave output voltage signal by selectively switching a number of half input wave cycles at one of two voltage levels to produce each half cycle of the stepped wave output voltage signal in order to maintain the rms voltage applied to the load between predetermined limits. The switched AC to AC converter further controls the shape of the stepped wave output signal by increasing the width of the full voltage pulse duration to provide instantaneous control over the rms output voltage.

DETAILED DESCRIPTION

Figure 1:
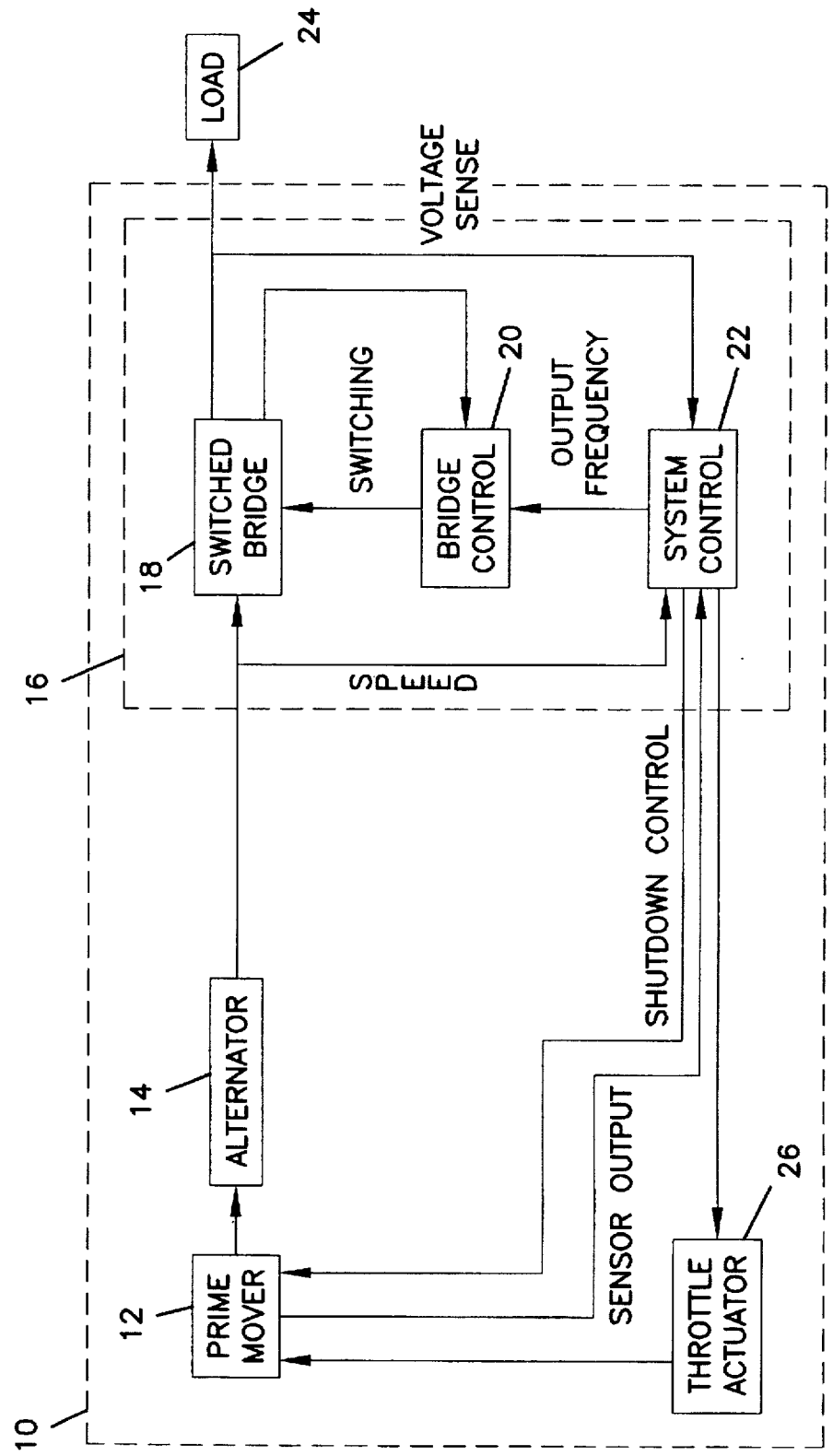
FIG. 1 is a simplified block diagram of a prior art electrical generator.

A prior art system, as disclosed by Kern et.al., WO 93/26082 for implementing a generator which maintains both a square wave output frequency within predetermined limits through the use of a controlled bridge and an rms output voltage within predetermined limits through the control of an external prime mover is illustrated in FIG. 1.

The generator 10 includes a prime mover 12, preferably a gasoline-power internal combustion engine, which drives an alternator 14, preferably of the multipole, permanent magnet variety. The output of the alternator 14, comprising single or multi-phase current, is directed to a switched rectifier 16, alternately known as an envelope cycloconverter, which generates an AC output having a frequency lower than the frequency of the AC input from the alternator 14.

Control and switching circuitry is provided within the switched rectifier for maintaining the frequency and rms voltage of the AC output within predetermined limits, including a switched bridge 18 comprising a number of triacs, a bridge control 20 and a system control 22. The output from the alternator 14 is applied to the input of the switched bridge 18, comprising a number of triacs, which, in a manner known to those skilled in the art, provide full wave rectification of the alternator 14 output current and produces a continuous series of unidirectional pulses, each pulse corresponding to a half-cycle of each phase of the output from the alternator 14. The polarity of the unidirectional pulses can be controllably switched by the triacs to have either a positive or negative polarity at the output of the switched rectifier 16. The series of alternating positive and negative pulses is available for application to a load 24.

Figure 2:
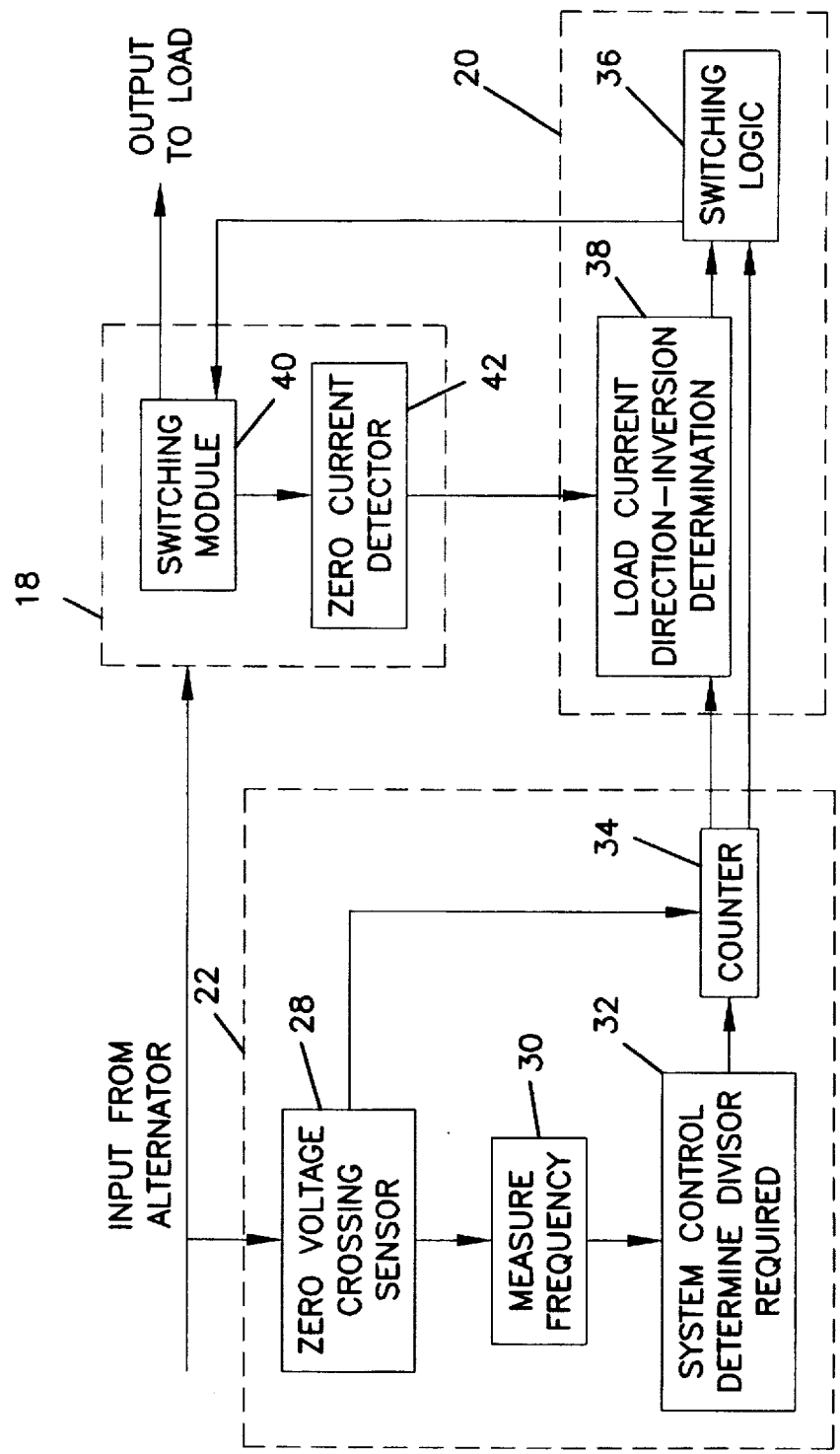
FIG. 2 is a functional block diagram of a prior art electrical generator.

The polarity of the unidirectional pulses at the output of the switched rectifier 16 is controlled by the bridge control 20, under direction from the system control 22. Switching between positive and negative polarity in the output from the switched bridge 18 occurs at a cyclical rate substantially equal to the desired output frequency from the generator. The detailed description of how the system control 22 maintains the output within the pre-determined frequency range is discussed below in reference to FIG. 2.

The system control 22 senses the peak voltage of the output from the switched rectifier 16. The system control 22 controls the speed of the prime mover 12 using the throttle actuator 26 in accordance with the peak voltage sensed. Where the system control 22 senses that the peak voltage is lower than required, it operates the prime mover 12 to produce an increased voltage. Where the system control 22 senses that the peak voltage is higher than required, it operates the prime mover 12 to produce a reduced voltage. The system control 22 also receives inputs from the prime mover 12 indicating operating conditions and provides additional control commands The system control 22 comprises a zero voltage crossing sensor 28 which detects zero-voltage crossing points of the alternator potential, thus allowing the system control 22 to count half-cycles of the AC output from the alternator 14. The system control 22 further comprises a frequency measurement unit 30 for determining the frequency of the alternator AC output from the zero-voltage crossing sensor 28 data. The measured frequency is then directed to the divisor determination circuit 32, which determines by which integer, N, the alternator AC output frequency must be divided in order to produce an output current with a frequency lying within the predetermined range, for example 56–60 Hz. The value N is then sent to the counter 34 which, in response to a count signal from the counter 28 counts up the calculated number, N, of half cycles of the alternator output current. Once the counter 28 has reached N, the counter 28 sends a signal to the switching logic 36, which controls the switching of the triacs in the switching module 40, to reverse the polarity of the output from the switched bridge 18. The counter also signals a load direction/inversion determination circuit 38 which signals the switching logic 36 to invert the signal generated by the triacs.

Figure 3A:
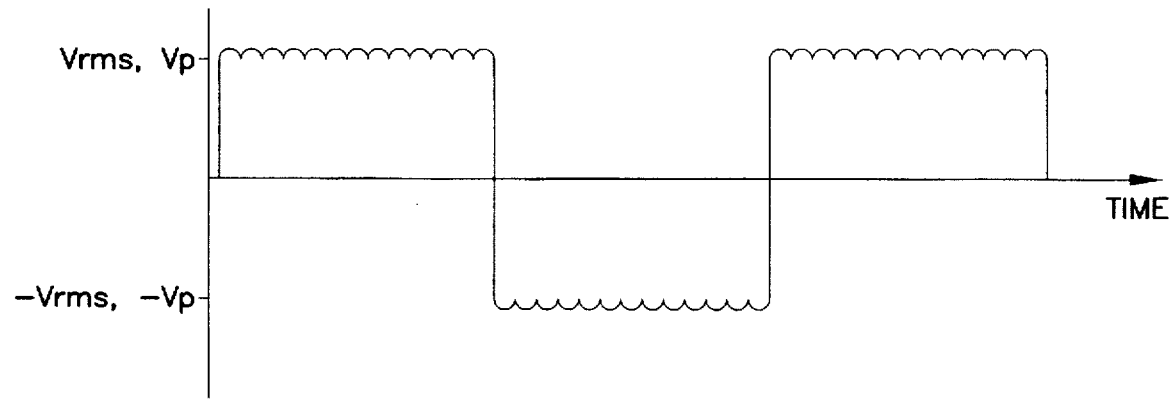
FIGS. 3a and 3b are graphs illustrating various output waveforms of the prior art.

The steady state output from the prior art generator is illustrated in FIG. 3a, which shows a single cycle of the output waveform, comprised of a sequence of half cycles taken from the alternator 14 output. As described in the above paragraphs, the positive portion of the waveform is comprised of an integer number of half alternator output cycles, the illustrated case using N=13 half cycles. After the counter has counted to 13, the triacs are ordered to reverse polarity of the output and so a negative component, also comprising 13 half alternator output cycles is generated before another change in polarity. The waveform is rippled at the peak voltage level $V_p$, corresponding to the series addition of the half alternator output cycles. If the peak voltage, $V_p$, of the waveform is taken to be the average voltage through the rippled portion, and if the rise and fall times, of the square wave are short relative to the period of the waveform, then the rms voltage, $V_{rms}$, is approximately the same as the peak voltage, i.e. a value of $V_p$=120 V for this waveform results in a value of $V_{rms} \approx 120$ V also.

Figure 3B:
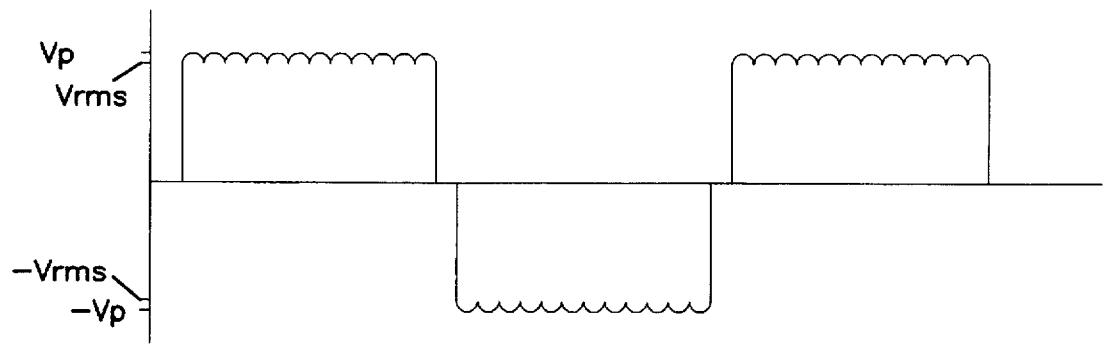

Also disclosed in the prior art is a method for reducing the rms voltage of the output AC waveform when there is a sudden reduction in load conditions, e.g. if a load is disconnected. The inertia of the alternator 14 and the prime mover 12 prevent instantaneous response to changes in the load current, so a sudden reduction in the load may result in potentially dangerous overvolting conditions. In order to avoid overvolting, the rms voltage is reduced below the peak voltage by eliminating selected alternator half cycles comprising the output from the switched bridge 18. FIG. 3b illustrates a waveform in which the first alternator output half cycle has been eliminated. The eliminated half-cycles are reinstated to the output waveform once the prime mover 12 and alternator 14 have slowed down to give, once again, a peak voltage equal to the rms voltage.

Figure 4A:
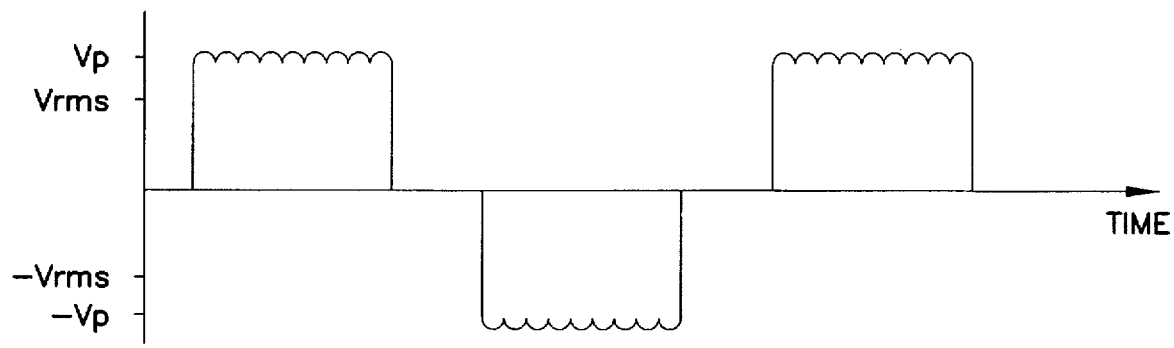
FIG. 4a illustrates an output voltage waveform of the first embodiment under steady state load conditions.

An example of the steady state output waveform of the first embodiment of the present invention is illustrated in FIG. 4a. The waveform shows a voltage pulse comprised of a number of half cycles of the alternator output. The positive portion of the waveform comprises a first "dead time", whose duration is an integer number, M"/2, of alternator output half cycles, and during which the voltage is essentially zero, followed by a square-shaped voltage pulse, comprised of another integer number, M', of alternator output half cycles, followed by another "dead time" of essentially zero voltage, lasting M"/2 alternator output half cycles. In the example shown in FIG. 4a, M'=9 and M"=4. Thus the total number of alternator output half cycles M=M'+M"=13. The negative half of the cycle comprises two alternator output half cycles of "dead time", 9 negative voltage half cycles of alternator output and a further two cycles of "dead time," generated before another change in polarity. The waveform is a quasi-sine wave, which is a waveform having essentially three voltage levels, $V_p$, 0, and $-V_p$, and where the ratio of rms to peak voltage is approximately the same as the rms to peak voltage ratio for a sine wave. The voltage pulse is essentially top-hat in shape with the non-zero voltage portion having a ripple corresponding to the serial addition of the alternator output half cycles. The peak voltage, $V_p$, is taken to be the average voltage through the rippled portion and, for the quasi-sine waveform, is around √2 times higher than the rms voltage, $V_{rms}$. For example, if $V_p$=170 V, then $V_{rms} \approx 120$ V.

The quasi-sine wave is a waveform comprised of a series of top hat-shaped pulses, with a total "dead time" during a waveform period equal to around one third of the period duration and which approximates a sine wave in the sense that essentially no third harmonic, or multiple thereof, is present. It is known in the art that the third harmonic is the major component producing losses and heating effects in induction motors. Thus, the generation of a quasi-sine wave using the present invention affords the ability to operate induction motors with lower losses than when operating with prior art electrical generators which generate a square wave.

Figure 5:
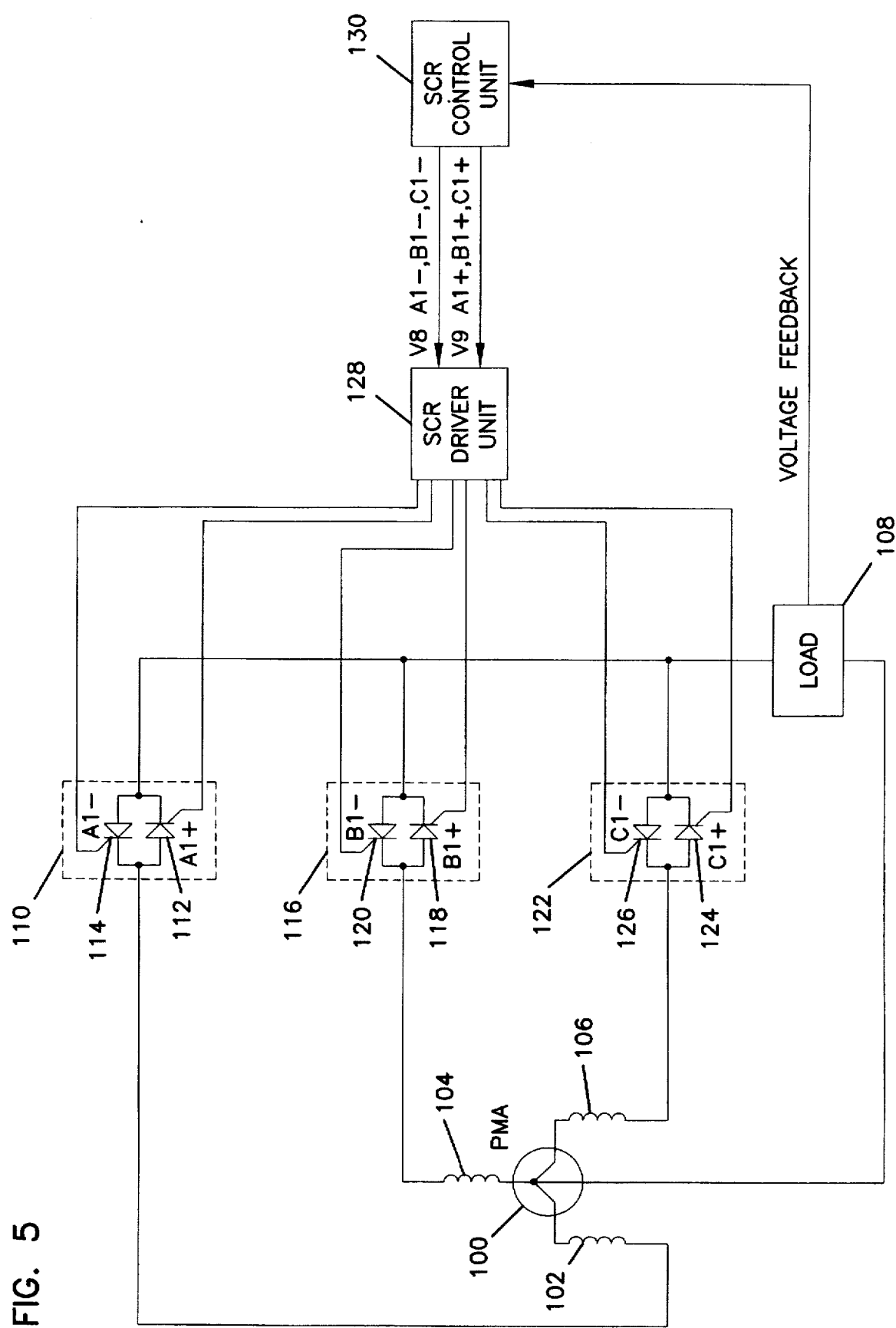
FIG. 5 shows a circuit schematic for a first embodiment of the present invention for generating a quasi-sine wave output.

Illustrated in FIG. 5 is a generalized circuit for producing a quasi-sine wave output at a load, such as is illustrated in FIG. 4a. The generalized circuit is essentially a rectifying circuit which incorporates switching means, such as a transistor or a thyristor or a silicon controlled rectifier for switching each branch of the rectifier with the correct timing. An electrical generator, preferably a permanent magnet alternator (PMA) 100 produces a three phase output. The three phases, A, B, and C are generated in the phase A stator winding 102, phase B stator winding 104 and phase C stator winding 106 of the PMA 100, respectively. The phase A stator winding 102 is connected to the load via a first switch 110. Typically, the first switch 110 includes parallel but oppositely oriented silicon controlled rectifiers (SCRs) 112 and 114. In a similar manner, the phase B stator winding 104 is connected to the load via a second switch 116, which includes parallel but oppositely oriented SCRs 118 and 120. Similarly, the phase C stator winding 106 is connected to the load 108 through a third switch 122, which includes parallel but oppositely oriented SCRs 124 and 126. The first SCR of each switch, namely SCRs 112, 118 and 124 are triggered when the voltage from the PMA is positive. The second SCR of each switch, namely SCRs 114, 120, and 126 are triggered when the voltage from the PMA 100 is negative. Therefore, the use of switches having oppositely oriented, independently triggered two SCRs allows the selectively switched application of both positive and negative voltages to the load 108. The SCRs 112, 114, 118, 120, 124, and 126 are triggered by the SCR driver unit 128. The SCR driver unit 128 receives control signals from the SCR control unit 130. The SCR control unit 130 produces control pulses for triggering the SCRs, so as to maintain an rms voltage applied at the load 108 close to 120 V.

Figure 6:
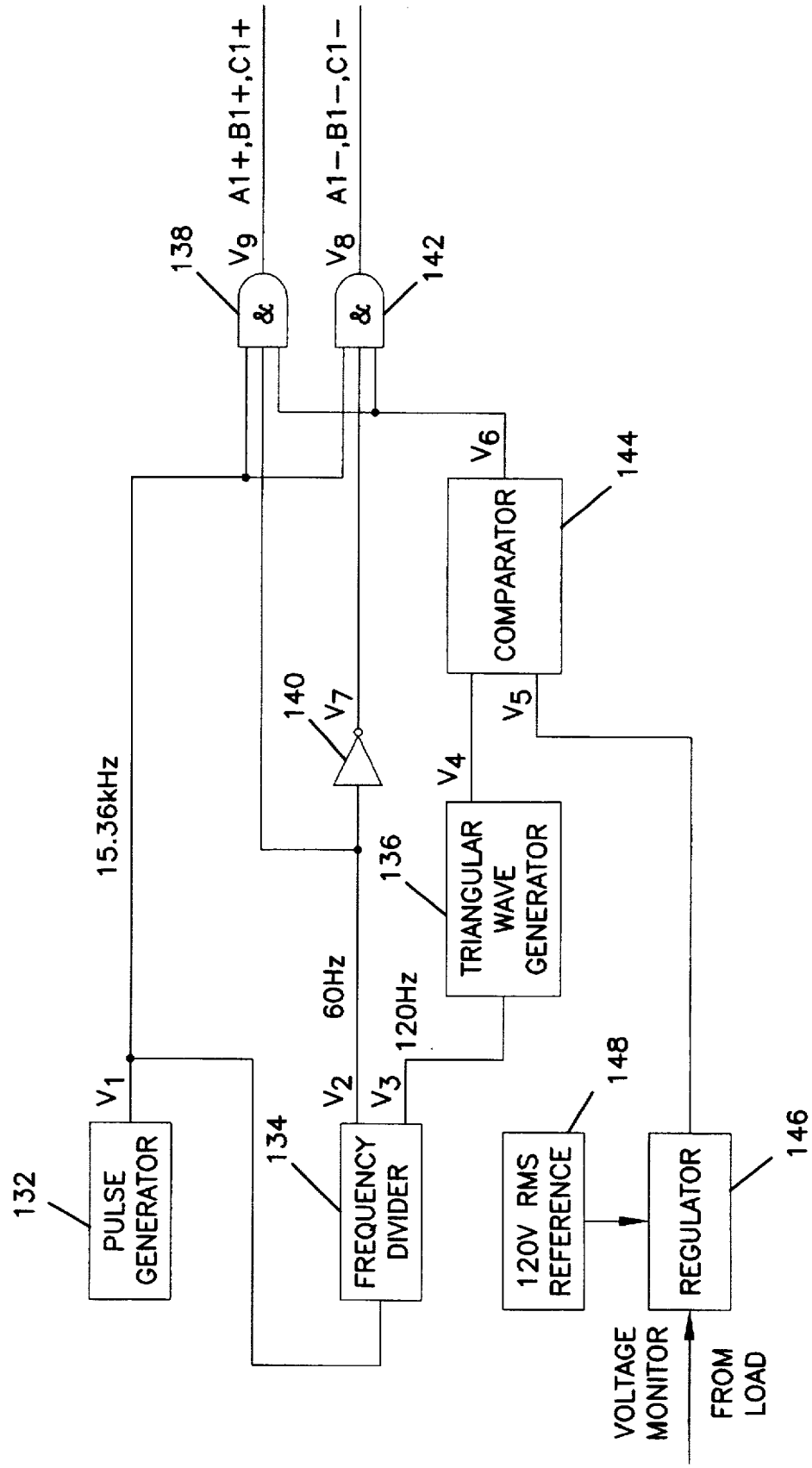
FIG. 6 shows a detailed circuit schematic for the SCR control unit according to the first embodiment of the present invention.

The SCR control unit 130 is shown in block schematic in FIG. 6. A pulse generator 132 generates a reference frequency, signal V1, typically at 15.36 kHz. It is understood that several known types of pulse generator may be used to generate the reference frequency. The reference frequency is directed to a frequency divider 134 which generates outputs at 60 Hz and 120 Hz, respectively. The 60 Hz output, signal V2, is directed to the first AND gate 138 and inverted at inverter 140, signal V7, and directed to the second AND gate 142. The AND gates 138 and 142 also receive as inputs the reference frequency from the pulse generator 132. The second output from the frequency divider, signal V3, at 120 Hz, is directed to the triangular wave generator 136, which may typically be implemented as an integrator. The triangular wave generator 136 generates a triangular wave output, signal V4, which is directed to the comparator 144. The comparator 144 also receives as an input a regulator signal, V5, generated by the regulator 146. The regulator signal V5 is related to an error signal produced by the regulator by comparing the voltage monitored at the load and a 120 $V_{rms}$ reference voltage generated by a reference voltage source 148.

Figure 7:
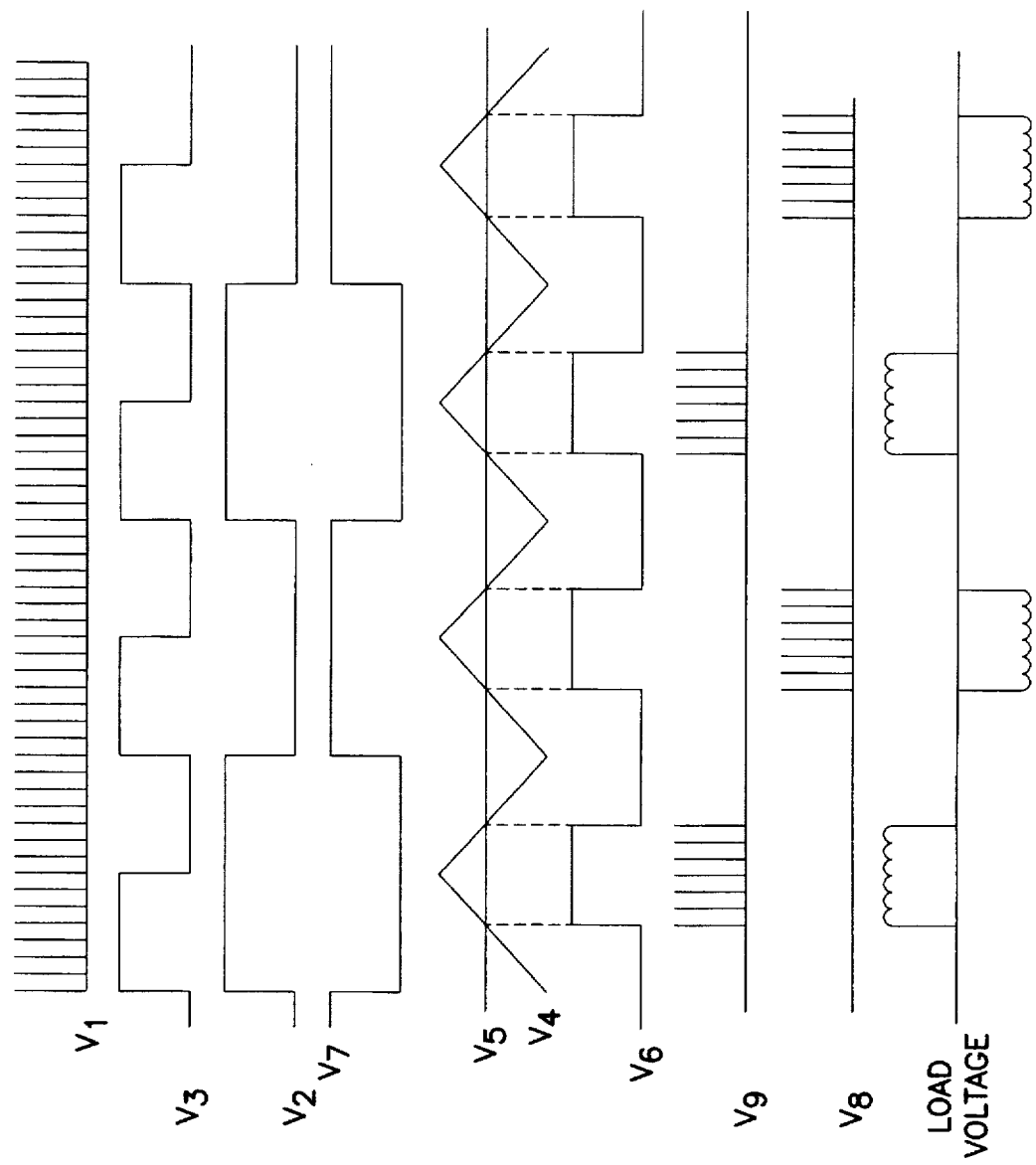
FIG. 7 is a timing diagram for various signals in the first embodiment of the present invention.

The timing diagram illustrated in FIG. 7 is useful in explaining the operation of the AC to AC converter and the SCR control unit 130. Signal V6, output by the comparator, is set high when the triangular wave signal V4 is larger than the regulator signal V5. V9 represents trigger output from the SCR control unit 130 to the SCR driver unit 128 for the first set of SCRs, 112,118 and 124. V9 is generated by the first AND gate 138, whose inputs are the reference signal V1, the 60 Hz signal V2, and the comparator signal V6. Signal V8, the trigger output from the SCR control unit 130 to the SCR driver unit 128 for the second set of SCRs 114, 120, and 126, is generated by the second AND gate 142. The second AND gate 142 takes as inputs the reference signal V1, the inverted 60 Hz signal V7 from the inverter 140, and the comparator signal V6. Trigger signals V8 and V9 are applied to the SCR driver unit 128. The SCR driver unit 128 is a conventional SCR driver and for each input signal to the SCR driver unit 128, the input signal drives three isolated trigger circuits, preferably through a pulse transformer or an opto-isolator, for triggering each SCR. For example, the signal V9 drives three individual trigger signals, the trigger signals being directed simultaneously to the first set of three SCRs 112, 118, and 124. Thus, SCRs 112, 118, and 124 are all driven together, during the positive half-cycle of the output cycle. In a similar manner, the signal V8 drives three trigger signals so as to trigger the remaining SCRs 114, 120, and 126 simultaneously during the negative half-cycle of the output cycle. Each set of SCRs is triggered at the reference frequency. Since an SCR requires a trigger and a voltage of at least approximately +5 V applied between the anode and cathode in order to conduct, only one SCR out of each set conducts at any one time. For example, if the voltage across phase A stator winding 102 is higher than the voltages across phase B and C stator windings 104 and 106, then application of a trigger pulse to the first set of SCRs 112, 118, and 124 results in SCR 112 conducting while SCRs 118 and 124 remain open. Consequently, the output voltage applied to the load 108 is the voltage across the phase A stator winding 102. Once the voltage on the phase A stator winding 102 has fallen to the point where the voltage on another phase stator winding is higher, for example phase B stator winding 104, then application of a trigger signal to the first set of SCRs 112, 118, and 124 results in SCR 118 conducting while SCRs 112 and 124 remain open. Therefore, the output voltage applied to the load 108 is the voltage across phase B stator winding 104. The voltages across all three stator windings 102, 104, and 106 are typically applied several times to the load 108 during the positive half of the output voltage cycle.

Considering now the negative half-cycle of the output voltage, when the voltage across phase A stator winding 102 is more negative than the voltages across phase B and C stator windings 104 and 106, then application of trigger signals to the second set of SCRs 114, 120, and 126 results in closing SCR 114 while SCRs 120 and 126 remain open, and the output voltage across the phase A stator winding 102 is applied to the load 108. Once the voltage across the phase A stator winding 102 becomes less negative than, for example, the voltage across phase B stator winding 104, then application of trigger signals to the second set of SCRs 114, 120, and 126 results in SCR 120 closing, while SCRs 114 and 126 remain open, and the output voltage applied to load 108 is the voltage across the phase B stator winding 104. The voltages across all three stator windings 102, 104, and 106 are typically applied several times to the load 108 during the negative half of the output voltage cycle.

Under steady state load conditions, the PMA 100 is rotated at a speed so that the peak voltage applied to stator windings 102, 104, and 106 is approximately 170 V. Preferably, the peak voltage applied to the load 108 is approximately √2 times the rms voltage applied to the load 108 and so the width of the voltage pulse applied to the load 108 in a half cycle is approximately 70% of the duration of the half-cycle.

Figure 4B:
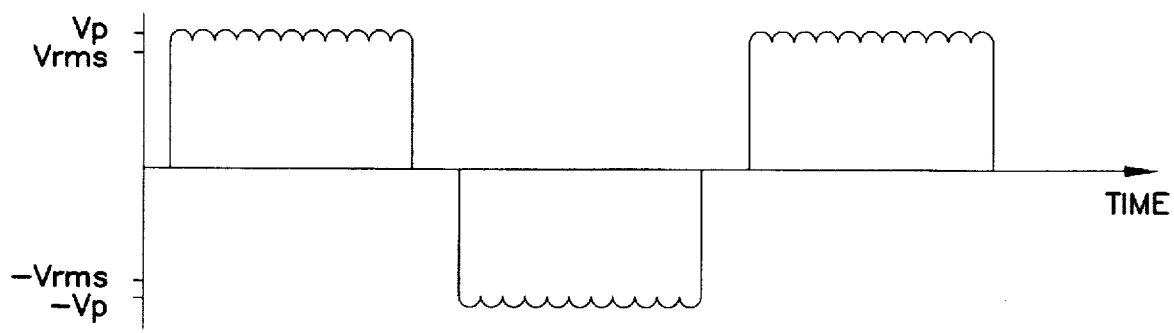
FIG. 4b illustrates an output voltage waveform of the first embodiment under increasing load conditions.

When the conditions of the load change, for example when a new appliance is added to the load circuit, the rms voltage applied to the load falls. This voltage fall is detected by the regulator 146, resulting in a fall in the value of the regulator signal V5. The pulses of the comparator signal V6, which are high when the regulator signal V5 is lower than the triangular wave V4, increase in width, resulting in the application of longer comparator pulses to the AND gates 138 and 142. Consequently, more half-cycles from the PMA 100 are added to the positive and negative half-cycles in the output voltage applied to the load 108. Another important aspect of the invention is that the rms voltage applied to the load may be kept constant even although the peak voltage is reduced, as shown in FIG. 4b. Not shown in FIGS. 5 and 6 is a control circuit for controlling the speed of the PMA 100. The PMA control circuit adjusts the speed of the PMA 100 according to load conditions. The PMA 100 is therefore a variable speed system, and its speed may be varied according, for example, to the size of load detected, or the peak voltage applied to the load 108. It is understood that the PMA 100 may be controlled in accordance with one of many variables in the circuit, which do not affect the present invention. It is also understood that the variable speed system has a relatively slow time response because of the inertia of the PMA 100 and the motor driving the PMA 100, and cannot react quickly to changes in load conditions. However, the circuits described in FIGS. 5 and 6 provide rapid compensation for the variation in rms voltage applied to the load in order to maintain a stable rms voltage. Once the variable speed PMA 100 has adjusted rotation rate to compensate for changed load conditions, the level of regulator signal V5 increases, resulting in a reduction in the width of the comparator pulses V6 and a reduction in the number of half cycles of the PMA output in each half cycle of the output voltage, back to steady state conditions.

Figure 4C:
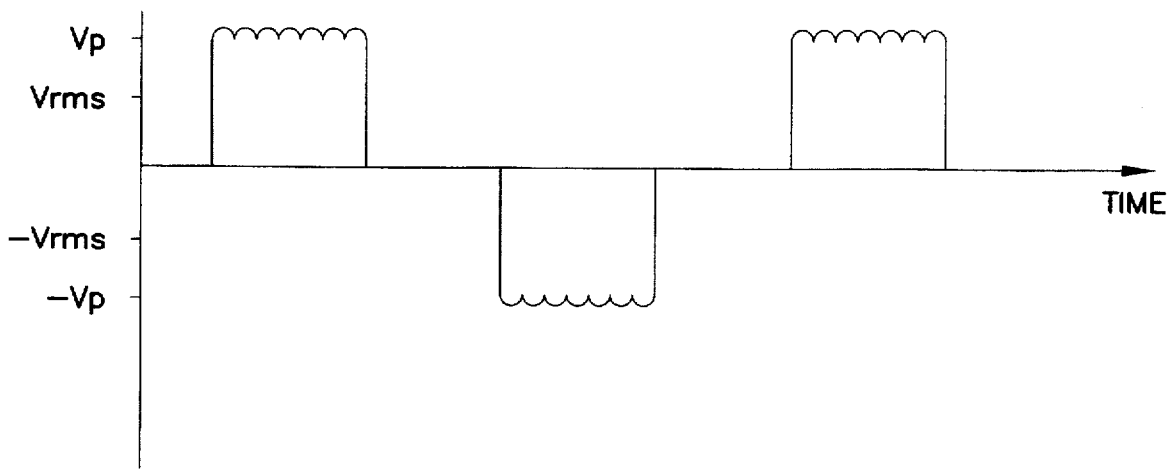
FIG. 4c illustrates an output voltage waveform of the first embodiment under decreasing load conditions.

When load conditions are suddenly decreased, for example when an appliance is removed from the load 108, the rms voltage monitored on the load 108 increases, resulting in an increase in the regulator signal V5 generated by the regulator 146. Consequently, the width of the pulses generated by the comparator 144 reduce, resulting in a decreased period of time within one cycle over which trigger signals V8 and V9 trigger their respective SCRs as shown in FIG. 4c. Therefore, the rms voltage applied to the load 108 is also maintained at a constant level, despite increases in the peak voltage applied. Once the variable speed PMA 100 has adjusted rotation rate to compensate for the changed load conditions, the level of regulator signal V5 reduces, resulting in an increase in the width of the comparator pulses and an increase in the number of half cycles of the PMA output in each half cycle of the output voltage back to steady state conditions.

Therefore, according to the first embodiment of the invention, a voltage can be applied to a load where the rms voltage is maintained to be stable under conditions of increasing or decreasing load. This is in contrast to the prior art, in which the AC generator only responds quickly to reductions in load and cannot respond quickly to increases in the load.

Figure 4D:
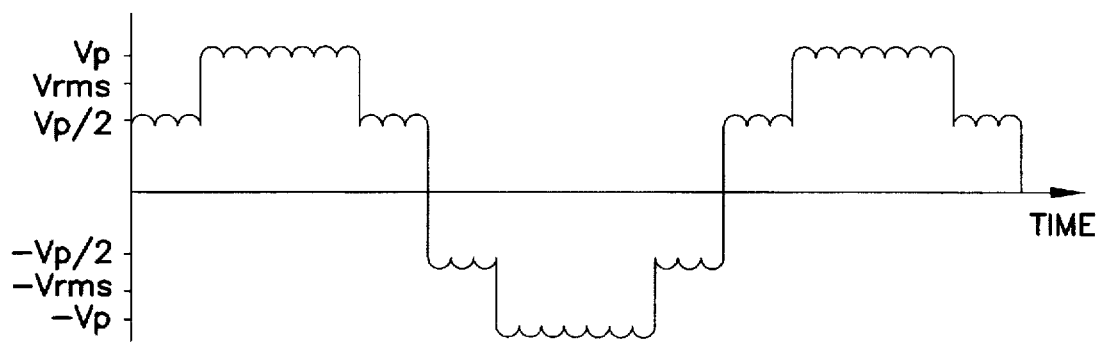
FIG. 4d illustrates an output voltage waveform of the second embodiment under steady state load conditions.
Figure 8:
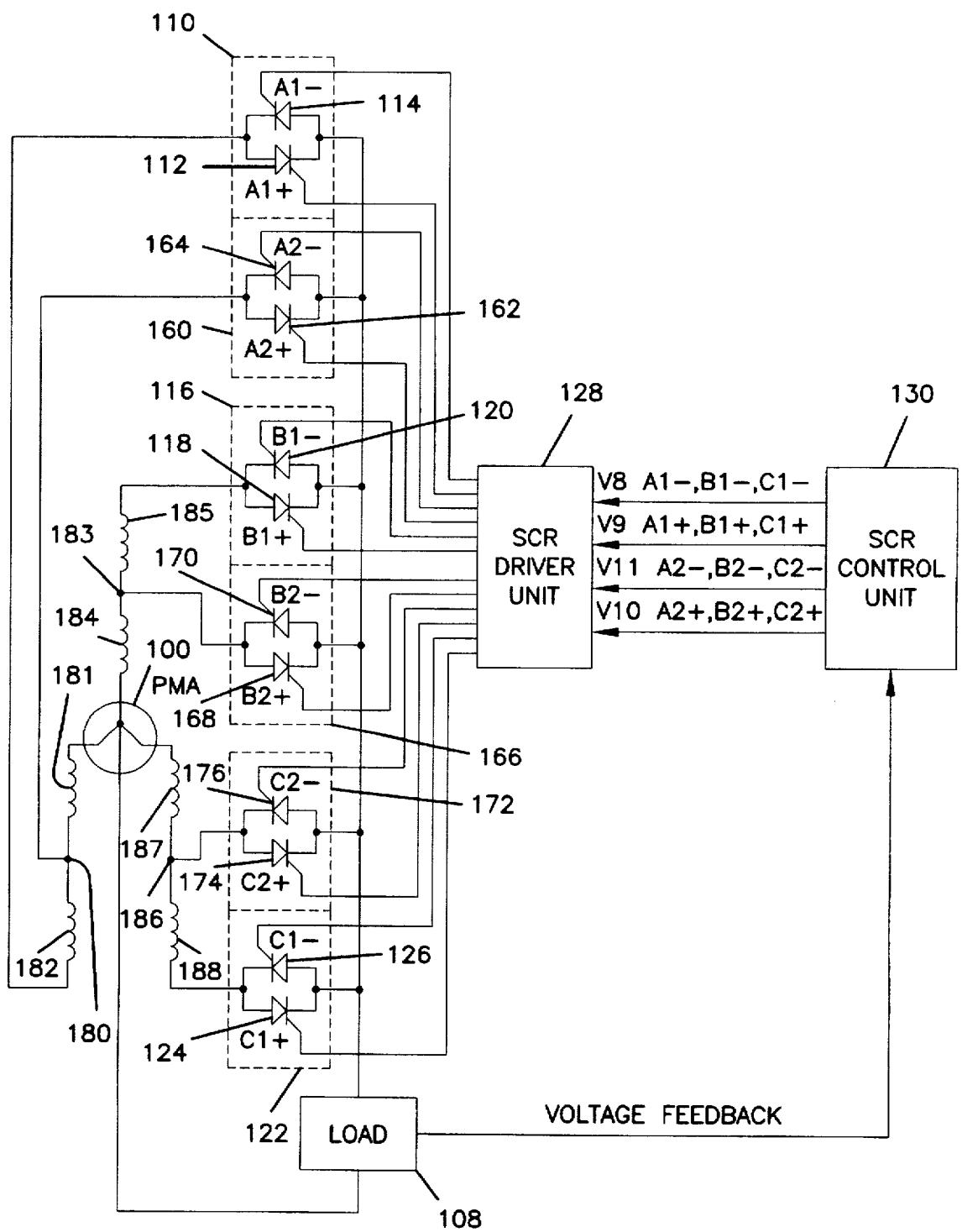
FIG. 8 shows a circuit schematic for a stepped wave generator according to a second embodiment of the present invention.
Figure 9:
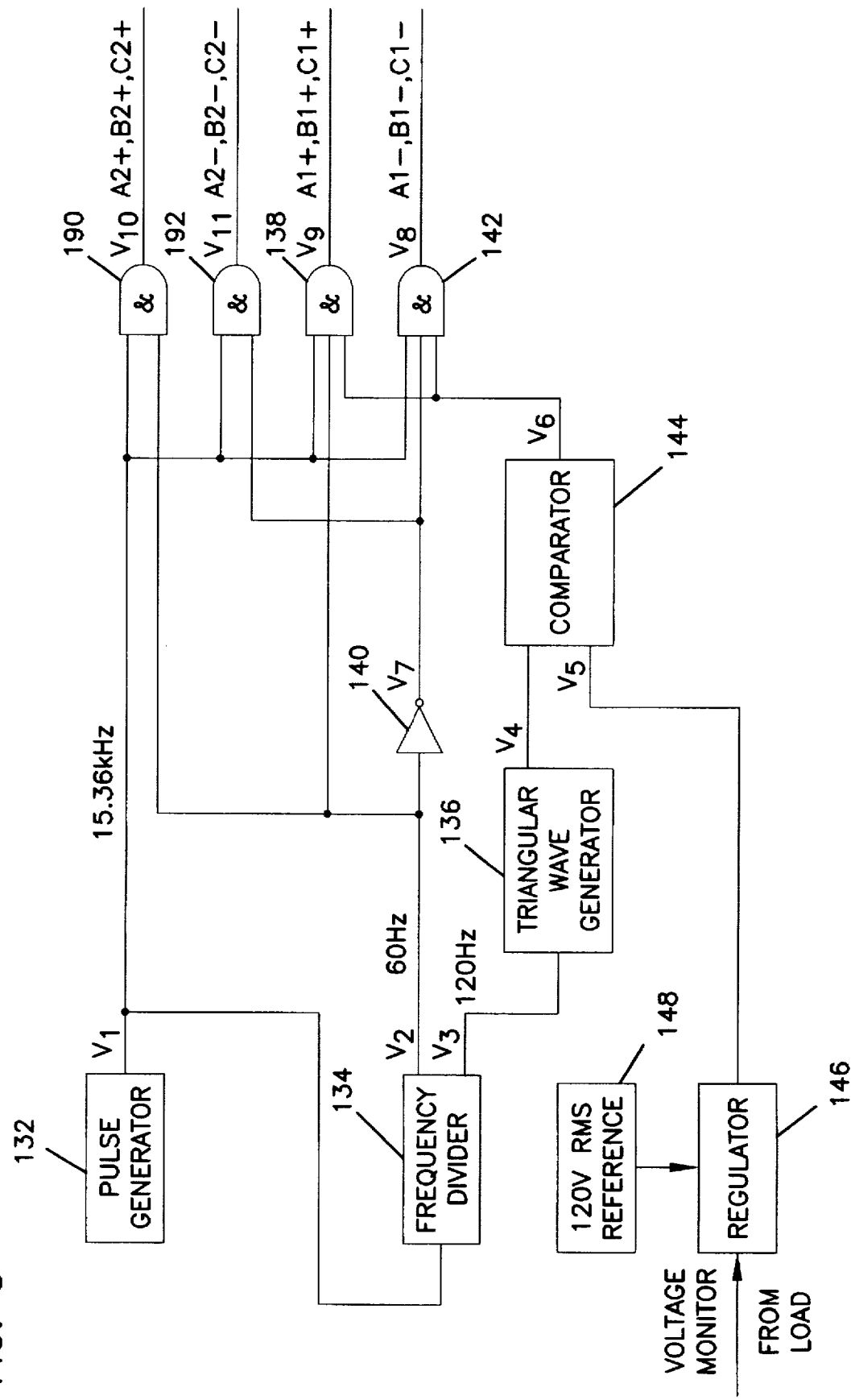
FIG. 9 shows a detailed circuit schematic for the SCR control unit of the second embodiment of the present invention.
Figure 10:
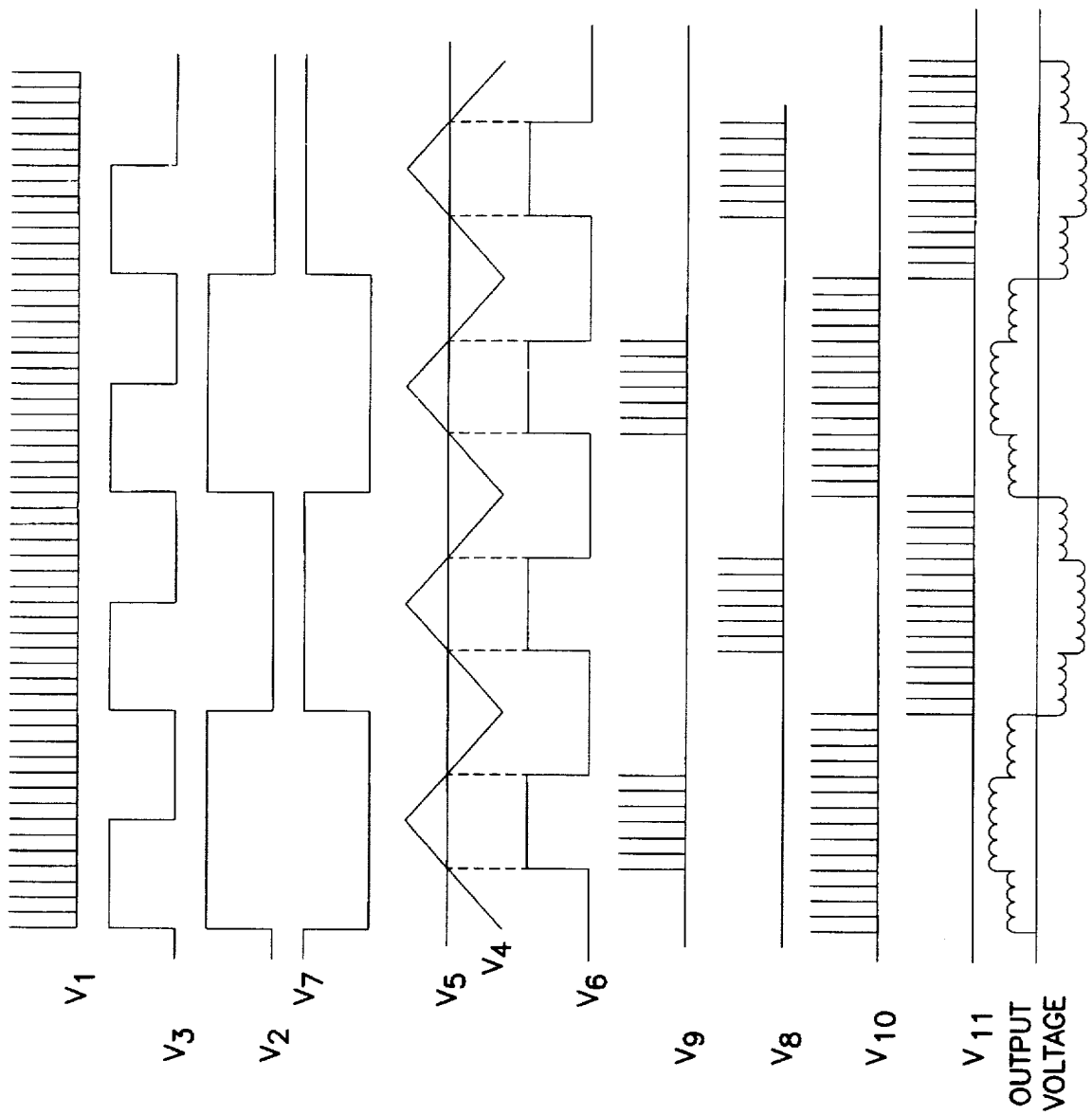
FIG. 10 is a timing diagram for various signals in the second embodiment.

FIGS. 8 and 9 illustrate a second embodiment of the invention to generate stepped wave output voltage signal such as is seen in FIG. 4d, and FIG. 10 illustrates timing of the associated signals. A stepped waveform has essentially four voltage levels, $V_1$, $V_p$, $-V_1$, and $-V_p$, and only has zero crossings, without generating an output voltage of zero volts for any significant length of time. For the stepped waveform illustrated in FIG. 4d, the intermediate voltage level $V_1=V_p/2$. It is understood that the intermediate voltage level need not be equal to $V_p/2$, but may also be some other intermediate value without crossing outside the scope of this invention. Elements which are similar to the elements shown in FIGS. 5–7, are identified with the same element number, and are not explained further. The stator winding for each phase is center tapped, so that either the full voltage on that winding or half the voltage may be switched. The phase A stator winding 102 is center tapped at point 180 so as to produce an inner phase A stator winding 181 and an outer phase A stator winding 182, where the inner and outer phase A stator windings 181 and 182 taken in series are equivalent to the phase A stator winding 102. The phase B stator winding 104 is center tapped at point 183 so as to produce an inner phase B stator winding 184 and an outer phase B stator winding 185, where the inner and outer phase B stator windings 184 and 185 taken in series are equivalent to the phase B stator winding 104. The phase C stator winding 106 is center tapped at point 186 so as to produce an inner phase C stator winding 187 and an outer phase C stator winding 188, where the inner and outer phase C stator windings 187 and 188 taken in series are equivalent to the phase C stator winding 106. A fourth switch 160 is connected to the phase A center tap 180. Like the first switch, the fourth switch 160 includes two SCRs in parallel and with opposing orientation. A fifth switch 166 is connected to the phase B center tap 183. The fifth switch 166 includes two SCRs 168 and 170 connected in parallel but having opposite orientation. The sixth switch 172 is connected to the phase C center tap 186. The sixth switch 172 includes two SCRs 174 and 176 connected in parallel, but having opposite orientation. The SCR control unit 130 delivers four control signals to the SCR driver unit 128, including V9 which drives the first set of SCRs 112, 118, and 124, V8 which drives the second set of SCRs 114, 120, and 126, V10 which drives the third set of SCRs 162, 168, and 174, and V11 which drives the fourth set of SCRs 164, 170, and 176.

Referring now to FIG. 9, the SCR control unit 130 includes additional AND gates 190 and 192. The third AND gate 190 takes as inputs the reference frequency generated by the pulse generator 132, signal V1, and the 60 Hz frequency output from the frequency divider, signal V2. The third AND gate 190 generates an output signal V10 which drives the third set of SCRs 162, 168 and 174. The fourth AND gate 192 takes as inputs the reference frequency from the pulse generator 132, signal V1 and V7, the inverted 60 Hz signal generated by the inverter 140. The fourth AND gate 192 generates an output signal V1, which drives the fourth set of SCRs 164, 170, and 176. The operation of the circuit is discussed with reference to FIG. 10. The third AND gate 190 generates trigger signals to the SCR drive unit 128 when the 60 Hz clock signal V2 and the reference frequency signal V1 are both high. Thus, the third AND gate 190 generates trigger signals throughout the entire positive half of the output voltage V2. In a similar manner, the fourth AND gate 192 generates trigger pulses throughout the entire negative half of the output voltage cycle. Signal V10 generates trigger signals to the third set of SCRs 162, 168, and 174, respectively connected to center taps 180, 183 and 186. Thus, the voltage applied to the load when each of the SCRs 162, 168, and 174 is closed, is $V_p/2$ where $V_p$ is the peak voltage generated by the PMA 100. Therefore, the SCRs 162, 168, and 174 are triggered so as to apply an approximately stable voltage of $V_p/2$ to the load for the entire positive half of the output voltage cycle. Likewise, the SCRs 164, 170, and 176, connected respectively to center taps 180, 183 and 186, are triggered so as to apply an approximately stable voltage of $-V_p/2$ to the load 108 throughout the negative half of the output voltage cycle. However, considering only the positive half of the output voltage cycle for the time being, when the first AND gate 138 triggers the first set of SCRs 112, 118, and 124, the voltage applied to the load 108 is $V_p$, since the SCRs 112, 118, and 124 switches the full voltage generated by the PMA 100. When the full voltage is applied to the load 108 by the first set of SCRs 112, 118, and 124, then the voltage across the third set of SCRs 162, 168, and 174 is negative and the SCRs 162, 168 and 174 remain open. Thus, the positive half of the output voltage cycle is a stepped wave, as shown in FIG. 10.

In a similar manner, considering the negative half of the output voltage signal, the fourth set of SCRs 164, 170, and 176 is triggered throughout the entire negative half of the output voltage cycle so as to apply $-V_p/2$ to the load 108. However, when the second set of SCRs 114, 120, and 126 is triggered by the second AND gate 142, the voltage applied to the load 108 is $-V_p$, and SCRs 164, 170 and 176 remain open. Thus, the circuit presented in FIG. 9 controls the SCRs so as to produce the stepped wave output voltage seen in FIG. 10.

Figure 4E:
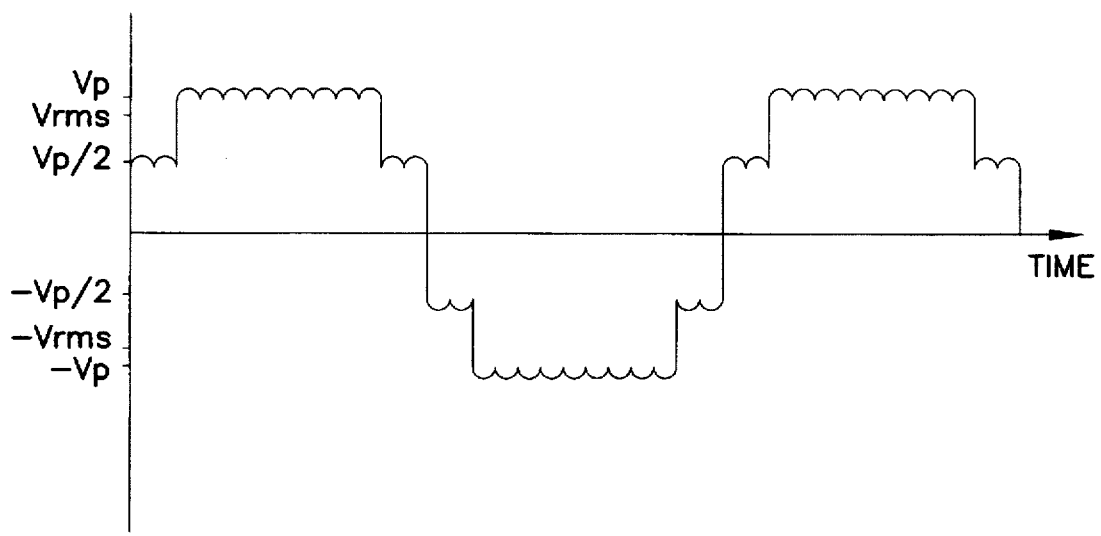
FIG. 4e illustrates an output voltage waveform of the second embodiment under increasing load conditions.

When conditions of the load 108 change, for example, by increasing so as to reduce the rms voltage applied to the load 108, the regulator signal V5 reduces, increasing the duration of the pulses generated by the comparator 144. Consequently, the first and second sets of SCRs, are activated for a greater portion of the output voltage cycle as illustrated in FIG. 4e. Thus, the rms voltage applied to the load remains constant, even though the peak voltage reduces due to increased load conditions.

Figure 4F:
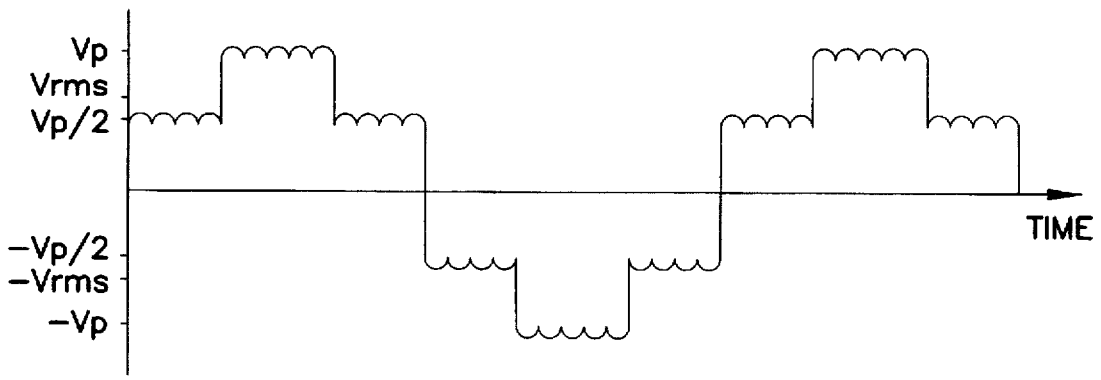
FIG. 4f illustrates an output voltage waveform of the second embodiment under decreasing load conditions.

When load conditions decrease, so as to increase the rms voltage applied to the load 108, the regulator signal V5 increases, thus reducing the duration of the pulses generated by the comparator 144. Consequently, the first and second sets of SCRs, each of which applies the full peak voltage to the load, are on for a smaller portion of the output voltage cycle as illustrated in FIG. 4f. Thus, when the peak voltage increases due to reduced load conditions, the rms voltage applied to the load 108 is maintained to be constant.

The circuit shown in FIGS. 8 and 9 is therefore able to provide instantaneous rms voltage control under both increasing and decreasing load conditions. This is in contrast to the prior art in which the AC generator can only respond to reductions in load, and cannot respond quickly to increases in the load.

As mentioned hereinabove, the PMA 100 is a variable speed system, and its speed may be adjusted according to the size of load detected, or the peak voltage being applied to the load 108. Therefore, the PMA 100 speeds up or slows down to account for increases and decreases in the load 108, respectively. Once the PMA 100 has achieved steady state conditions, the waveform applied to the load 108 also returns to its steady state value.

In the preferred steady state stepped square-wave output voltage waveform (of FIG. 4d), a single half-cycle of the output voltage includes a portion at which the voltage applied to the load is $V_p$. $V_p$ is applied to the load preferably for approximately 35% of the half-cycle duration, so as to accommodate both increases and decreases in load conditions. Additionally, when the duration of the voltage step at $V_P$ is around ⅓ of the positive half cycle and, likewise the duration of the voltage step at $-V_P$ is around ⅓ of the negative half cycle, then the ratio of $V_p \approx \sqrt{2} V_{rms}$ obtains.

An advantage of this second embodiment is that it provides an output voltage waveform whose rms value can be maintained to be constant despite the load conditions increasing and decreasing, and also provides zero crossings at the end and midpoint of each output voltage cycle.

This concludes the description of the preferred embodiment of the invention. The following describes some alternative methods of accomplishing the same objects. The unique conducting properties of the SCR, where the SCR opens when the applied voltage changes polarity, have been employed to simplify the circuits of the first and second embodiments. It is understood that other solid state switching devices, such as transistors could be used instead of the SCRs. It a transistor were to be used, appropriately timed trigger signals would have to be applied to trigger each transistor for only the duration of time in which that transistor is required to conduct. Unlike the SCR, the transistor conducts in current in both directions, and so if a transistor is not required to conduct at a particular time, then the transistor should not be triggered. Additionally, triacs may be used as the solid state switch if the appropriately timed trigger signals were provided. Regarding the shape of the stepped waveform, it is understood that selected combinations of intermediate voltage and peak voltage pulse durations may be used to obtain desired peak to rms voltage ratios and to control harmonic content of the output voltage waveform without departing from the scope of the invention. Regarding operation of the converter of the above described embodiments, the converter may operate in various geographic regions, where the rms voltage and frequency standards are different. For example, the converter may be designed to generate an output having an rms voltage and frequency of 120 V and 60 Hz, 240 V and 60Hz, 220 V and 50 Hz, or 200 V and 60 Hz.

In summary, converter circuits have been described which enable a user to convert the AC output from a generator to a usable AC output for driving appliances at, for example, 60 Hz. The converter circuits are designed so as to maintain a constant frequency and rms voltage applied to the load, even under conditions where the load increases or decreases. Additionally, the converter circuits maintain the same ratio of peak voltage to rms voltage as a conventional sine wave, thus avoiding problems encountered by many appliances when supplied with square wave line voltage.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An AC to AC converter circuit for generating a quasi-sine wave electrical signal, comprising:

a rectifying circuit which generates a rectified output signal from multi-phase alternating voltage input energy source; and switching means, operatively coupled to the rectifying circuit and including at least one switching device associated with each voltage phase arranged to switch each voltage phase individually, for controllably switching polarity of the rectified output signal to form a quasi-sine wave electrical signal having a selected alternating period and a selected voltage level, the selected voltage level of the quasi-sine wave electrical signal being approximately zero for approximately one third of the particular alternating period and approximately a peak voltage level for approximately two thirds of the particular alternating period under stable load conditions.

2. The AC to AC converter circuit of claim 1, wherein at least a portion of the switching means forms a part of the rectifying circuit.

3. The AC to AC converter circuit of claim 1, wherein the peak voltage level is approximately a square root of two times larger than a root mean square voltage level of the quasi-sine wave electrical signal.

4. The AC to AC converter circuit of claim 3, wherein the quasi-sine wave electrical signal has a root mean square voltage level of approximately 120 V and a frequency of approximately 60 Hz.

5. The AC to AC converter circuit of claim 3, wherein the quasi-sine wave electrical signal has a root mean square voltage level of approximately 220 V and a frequency of approximately 50 Hz.

6. The AC to AC converter circuit of claim 1, wherein the switching means includes a solid state switching device.

7. The AC to AC converter circuit of claim 1, wherein the selected alternating period is set by a reference frequency source.

8. The AC to AC converter circuit of claim 1, wherein the selected voltage has the value of the peak voltage level for a predetermined duration, the predetermined duration being responsive to conditions of increasing and decreasing load.

9. An AC to AC converter circuit for supplying power to a load, the circuit comprising:

a multiple phase source of alternating voltage having a first frequency;

a plurality of switches, each phase of the multiple phase source being connectable to the load by a respective switch of the plurality of switches; and a control unit to control operation of the switches so as to apply a single phase, quasi-sine wave output voltage to the load.

10. The AC to AC converter of claim 9, wherein each switch of the plurality of switches comprises two unidirectionally conducting solid state switches connected in parallel and with opposite orientation.

11. The AC to AC converter of claim 9, wherein the controller comprises a reference frequency source to generate a reference frequency, and a frequency divider to generate a first signal whose frequency is the same as a frequency of the quasi-sine wave output voltage.

12. The AC to AC converter of claim 11, wherein the controller comprises a voltage reference circuit to produce a reference voltage and a regulator to produce a regulator signal in response to the reference voltage and load voltage.

13. The AC to AC converter of claim 12, wherein the controller further comprises a triangular wave generator to generate a triangular wave having a frequency of twice the frequency of the first signal.

14. The AC to AC converter of claim 13, wherein the controller further comprises a comparator to produce a compare signal in response to a comparison between the regulator signal and the triangular wave.

15. The AC to AC converter of claim 14, wherein the controller triggers the plurality of switches in response to the compare signal.

16. The AC to AC converter of claim 9, wherein the controller controls the output voltage to the load to increase root mean square voltage applied to the load under increased load conditions and to reduce the root means square voltage applied to the load under reduced load conditions.

17. An AC to AC converter circuit for generating a stepped wave electrical signal, comprising:

a rectifying circuit which generates a rectified output signal from a multi-phased alternating voltage input energy source; and switching means, operatively coupled to the rectifying circuit, for controllably switching polarity of the rectified output signal to form a stepped wave electrical signal having a selected alternating period, a first voltage level and a second voltage level, the stepped wave electrical signal having a magnitude approximately equal to the first voltage level for around two thirds of the selected alternating period and a magnitude of approximately the second voltage level for around one third of the selected alternating period under stable load conditions, the switching means including at least one switching device for switching each voltage phase before combining the switched voltage phases.

18. The AC to AC converter circuit of claim 17, wherein the second voltage level is approximately a square root of two times larger than a root mean square voltage level of the stepped wave electrical signal.

19. The AC to AC converter circuit of claim 17, wherein the stepped wave electrical signal has a root mean square voltage level of approximately 120 V and a frequency of approximately 60 Hz.

20. The AC to AC converter circuit of claim 17, wherein the quasi-sine wave electrical signal has a root mean square voltage level of approximately 220 V and a frequency of approximately 50 Hz.

21. The AC to AC converter circuit of claim 17, wherein the stepped wave electrical signal has a voltage magnitude of approximately the second voltage for a predetermined duration, the predetermined duration being responsive to conditions of increasing and decreasing load.

22. An AC to AC converter circuit for supplying power to a load, the circuit comprising:

a multiple phase source of alternating voltage having a first frequency;

a plurality of switches, each phase of the multiple phase source connectable to the load through either of two respective switches of the plurality of switches; and a control unit to control operation of the switches so as to apply a single phase, stepped wave output voltage to the load.

23. The AC to AC converter of claim 22, wherein each switch of the plurality of switches comprises two unidirectionally conducting, independently triggerable, solid state switches connected in parallel and with opposite orientation.

24. The AC to AC converter of claim 22, wherein each phase of the multiple phase source connectable to the load through a first switch of the two switches so as to apply half of the alternating voltage to the load, and is connectable to the load through a second switch of the two switches so as to apply the alternating voltage to the load.

25. The AC to AC converter of claim 22, wherein the controller comprises a reference frequency source to generate a reference frequency, and a frequency divider to generate a first signal whose frequency is the same as a frequency of the quasi-sine wave output voltage.

26. The AC to AC converter of claim 25, wherein the controller comprises a voltage reference circuit to produce a reference voltage and a regulator to produce a regulator signal in response to the reference voltage and load voltage.

27. The AC to AC converter of claim 26, wherein the controller further comprises a triangular wave generator to generate a triangular wave having a frequency of twice the frequency of the first signal.

28. The AC to AC converter of claim 27, wherein the controller further comprises a comparator to produce a compare signal in response to a comparison between the regulator signal and the triangular wave.

29. The AC to AC converter of claim 28, wherein the controller selectively triggers the plurality of switches in response to the compare signal.

30. The AC to AC converter of claim 22, wherein the controller controls the output voltage to the load so as to increase root mean square voltage applied to the load under increased load conditions and to reduce the root means square voltage applied to the load under reduced load conditions.

31. The AC to AC converter of claim 23, wherein the plurality of switches comprises first, second, third and fourth sets of solid state switches, each set of solid state switches including a solid state switch associated with each phase of the multiple phase source, all solid state switches in each set of solid state switches oriented so as to conduct current through the load in one direction.

32. The AC to AC converter of claim 31, wherein the first and second sets of solid state switches are connected so as to apply full alternating voltage to the load and the third and fourth sets are connected so as to apply half of the alternating voltage to the load.

33. The AC to AC converter of claim 31, wherein the first and third sets of solid state switches are triggerable so as to apply voltage of a first polarity to the load and the second and fourth sets of solid state switches are triggerable so as to apply voltage of a second polarity to the load.

34. The AC to AC converter of claim 31, wherein the third and fourth sets of solid state switches are triggerable throughout the duration of time when voltage of their respective polarities is being applied to the load, and the first and second solid state switches are triggerable for selected durations when voltage of their respective polarities is being applied to the load.

35. The AC to AC converter of claim 34, wherein the selected durations when the first and second sets of solid state switches are triggerable are adjusted by the controller so as to maintain a constant root mean square voltage applied to the load under changing load conditions.

36. The AC to AC converter of claim 35, wherein the selected durations are increased when the load conditions increase and decreased when the load conditions decrease.

37. An AC to AC converter circuit for supplying power to a load from a multiple phase source of alternating voltage, the circuit comprising:

a plurality of switches, each phase of the multiple phase source being connectable to the load by a respective switch of the plurality of switches; and a control unit to control operation of the switches so as to apply a single phase, quasi-sine wave output voltage to the load.

38. An AC to AC converter circuit for supplying power to a load from a multiple phase source of alternating voltage, the circuit comprising:

a plurality of switches, each phase of the multiple phase source connectable to the load through a respective switch of the plurality of switches; and a control unit to control operation of the switches so as to apply a single phase, stepped wave output voltage to the load.

* * * * *